July 24, 1951 H. M. STEIN ET AL 2,562,069

SOUND-ACTUATED LAMP INDICATOR FOR TELEPHONE

Filed May 2, 1949

INVENTORS.
HAROLD M. STEIN
CARL M. SHERR

BY

ATTORNEY

Patented July 24, 1951

2,562,069

UNITED STATES PATENT OFFICE 2,562,069

SOUND-ACTUATED LAMP INDICATOR FOR TELEPHONES

Harold M. Stein and Carl M. Sherr, Denver, Colo.; said Stein assignor to said Sherr Application May 2, 1949, Serial No. 90,976

1 Claim. (Cl. 179—84)

This invention relates to a device for lighting a light on or near a telephone to designate to the called party the location of the particular phone being rung.

Residential telephones often ring at night, and it is sometimes difficult in the darkness to locate the phone. The principal object of this invention is to provide an automatic device which will be actuated by the sound waves from the telephone bell to close an electrical circuit to any desired illuminating device.

Another object of the invention is to provide a convenient support for a telephone which will securely hold the latter in place while dialing the phone and which will provide a convenient utility light at the phone.

While the invention is more particularly designed to be attuned to the magnitude of the sound waves of an adjacent telephone bell, it of course could be attuned and adjusted to close an electrical circuit in consequence of any preselected sound.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 3:
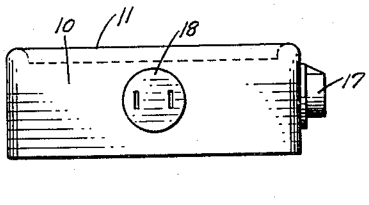
Fig. 3 is an end view thereof.
Figure 1:
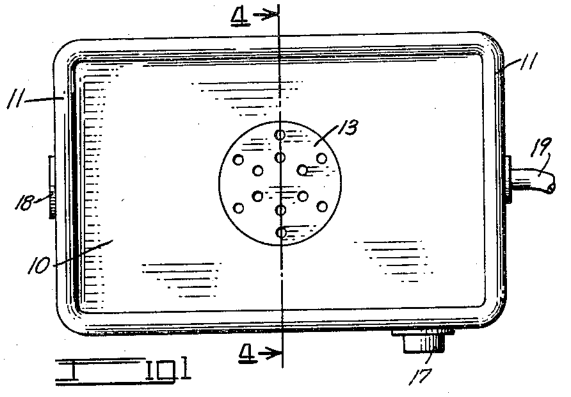
Fig. 1 is a plan view of the improved, automatic, telephone-illuminating device.
Figures 2, 4:
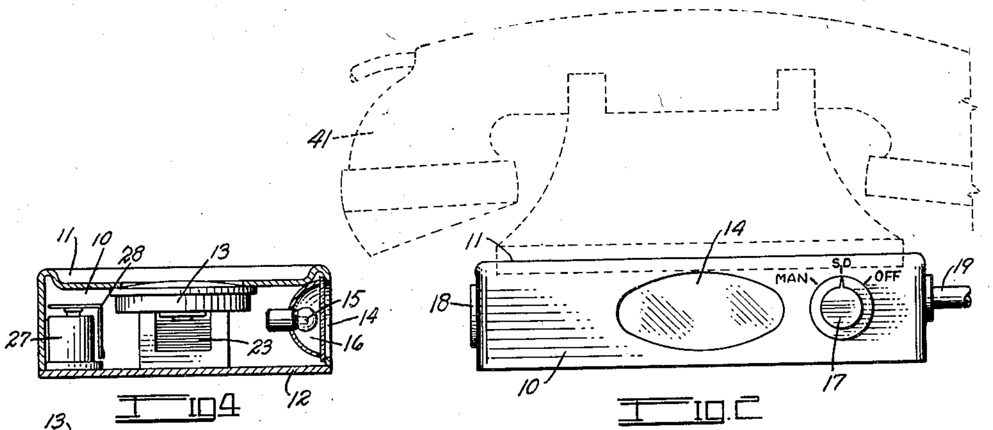
Fig. 2 is a side view thereof.
Fig. 4 is a cross-section, taken on the line 4—4, Fig. 1, illustrating the position of the interior mechanism.
Figure 5:
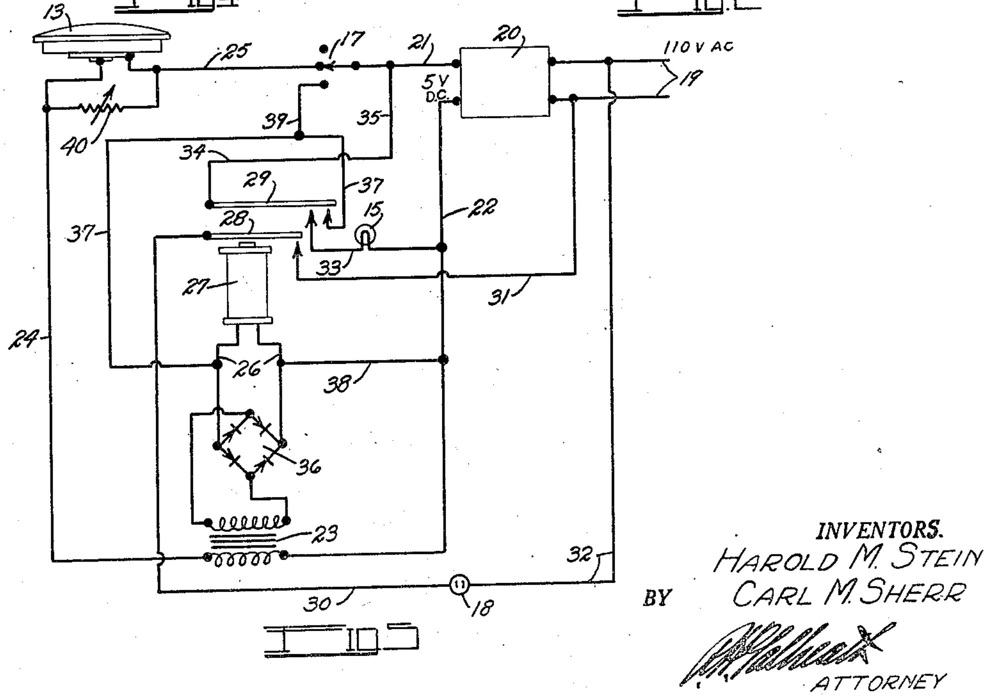
Fig. 5 is a circuit diagram, illustrating the electrical circuits employed in the device.

The invention comprises a box-like housing 10, the top of which is surrounded by a peripheral, raised flange or bead 11. The dimensions of the box and the bead are such that a modern, bell-containing telephone may be set upon the housing so as to be held securely in place thereon by the confining raised bead 11.

The bottom of the housing is closed by means of a removable bottom plate 12. The central portion of the top of the housing 11 is provided with an opening to receive a sound actuated, variable resistor element or microphone 13. The front side of the housing has a window opening 14, through which light rays from an electric lamp 15 are emitted. The lamp 15 is preferably provided with a suitable light reflector 16. The front of the housing is also provided with a three-contact switch 17 having "off," "on," and "manual" positions and one end of the box is provided with a standard electric outlet receptacle 18. Electric current is fed to the device through a suitable electric cord 19 from any available 110 volt A. C. source.

The housing contains a conventional power pack 20 which transforms and rectifies the 110 v. alternating current and supplies a 5 volt direct current to D. C. supply mains 21 and 22. The supply main 21 leads to the movable blade of the switch 17 and the supply main 22 leads to one side of the primary winding of a step-up transformer 23.

The other side of the primary winding of the transformer 23 is connected by means of a microphone conductor 24 to one post of the sound-actuated variable resistor or microphone 13. The other post of the microphone 13 is connected by means of a conductor 25 with the "on" contact of the switch 17.

Thus, when the switch 17 is in the "on" position, sound waves striking the microphone 13 will produce a vibrating current in the primary winding of the transformer 23 which will induce an alternating current in the secondary winding thereof.

The latter current is conducted by means of relay conductors 26 to a relay coil 27. The coil 27 is arranged to attract a first relay blade 28 and a second relay blade 29. The first blade 28 is connected to the receptacle 18 through a conductor 30, and acts to close a contact to a receptacle conductor 31 connected to one of the 110 v. mains 19. The other side of the receptacle 18 is in circuit with the other 110 v. main 19 through a conductor 32.

Thus, when the coil 27 is energized, it will actuate the blade 28 to close a circuit to the receptacle 18, and any desired device or light may be plugged into this receptacle to be automatically operated by this improved device.

The second blade 29 is connected to the D. C. main 21 through a connector 34 and acts to close a circuit with a lamp conductor 33 leading to the lamp 15. A second lamp conductor 35 leads from the lamp 15 to the other D. C. main 22.

Thus, when the second blade 29 is attracted by the coil 27, it closes a circuit from the D. C. main 21 through the connector 34, the lamp conductor 33, the lamp 15, the lamp conductor 35, to the other D. C. main 22 to illuminate the lamp 15 and the window 14.

Since the current fed to the relay coil 27 is alternating in nature, it has been found advantageous to insert a full-wave rectifier 36 in the circuit to the coil to increase the efficiency of the magnetic force of the relay coil 27.

The closing of the second blade 29 also completes a circuit with a bridging conductor 37 leading to one of the relay conductors 26. The other relay conductor 26 is connected to the D. C. main 22 through a connector 38. Therefore, when the blade 29 is attracted, it will close a circuit to the coil 27 from the mains 21 and 22 through the elements 34, 37, 26, and 38. This places the coil 27 directly across the D. C. mains so that the relay will remain closed, regardless of any further action on the part of the microphone 13, the lamp 15 will remain illuminated, and the receptacle 18 will remain energized until the circuit is broken by turning the switch 17 to the "off" position.

There may be times when it is desired to light the light 15 and energize the receptacle 18 independently of the microphone 13. This can be accomplished by turning the switch 17 to the "manual" position, where it will close a circuit from the main 21 to the conductor 37, through a connection 39, and from thence through the coil 27, the D. C. leads 26 and the conductor 38 to the main 22. This actuates the blade 29 to light the lamp 15 and close the circuit to the receptacle 18 until the switch is again turned to the "off" position.

The microphone 13 is bridged by means of a variable resistance element 40 through which a predetermined amount of direct current is continually fed through the transformer circuit to supply a bias thereto. The resistor 40 is so regulated that any desired vibration in the microphone 13 will produce the desired peak voltage to actuate the relay 27.

In use, a telephone, such as indicated at 40, is placed upon the housing 10 and the circuits are adjusted so that the sound of the telephone bell will cause sufficient electrical vibration in the transformer 23 to actuate the relay and illuminate the lamp 15. The lamp remains illuminated due to the bridging circuit 37—38 until the switch 17 is turned to the "off" position. When turned back to the middle or "on" position, the circuit is again set to catch the next ring of the telephone bell.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A device for lighting a light at a telephone in consequence of the audible ringing of the bell of said telephone, comprising: a box-like housing; a top in said housing; a bell-containing telephone resting on said top, there being an opening in said top below said telephone; a microphone positioned in said opening; a window in the side of said housing; an electric lamp supported in said housing behind said window; a transformer in said housing; a direct current circuit including said microphone and the primary winding of said transformer; a rectifier in circuit with the secondary of said transformer; a relay in circuit with said rectifier and actuated by direct current from the latter; a contact positioned to be closed by said relay; and a lamp circuit shunted across said direct current circuit and including said lamp and said contact and adapted to be closed by the latter.

HAROLD M. STEIN.
CARL M. SHERR.

REFERENCES CITED

The following references are of record in the file of this patent:

UNITED STATES PATENTS

| Number | Name | Date |
|---|---|---|
| 1,368,736 | Larigne | Feb. 15, 1921 |
| 1,778,980 | McKeldin | Oct. 21, 1930 |
| 1,872,372 | Wensley | Aug. 16, 1932 |
| 2,085,624 | Allen | June 29, 1937 |
| 2,202,432 | Santucci | May 28, 1940 |
| 2,222,476 | Caroselli | Nov. 19, 1940 |
| 2,287,998 | Johnson | June 30, 1942 |
| 2,316,540 | Danley | Apr. 13, 1943 |
| 2,348,301 | Lomax | May 9, 1944 |
| 2,391,882 | Conn | Jan. 1, 1946 |
| 2,393,272 | Van Deventer | Jan. 22, 1946 |
| 2,441,840 | Petruschell | May 18, 1948 |

FOREIGN PATENTS

| Number | Country | Date |
|---|---|---|
| 463,416 | Great Britain | Mar. 30, 1937 |
| 832,462 | France | Sept. 28, 1938 |